United States Patent
Chen

(10) Patent No.: US 7,725,753 B2
(45) Date of Patent: May 25, 2010

(54) IDENTIFICATION APPARATUS FOR BACKUP-TYPE POWER SUPPLY SYSTEMS

(75) Inventor: Tsung-Chun Chen, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 319 days.

(21) Appl. No.: 11/331,035

(22) Filed: Jan. 13, 2006

(65) Prior Publication Data

US 2007/0168052 A1  Jul. 19, 2007

(51) Int. Cl.
G06F 1/00 (2006.01)
G06F 11/00 (2006.01)

(52) U.S. Cl. .......................................... 713/340; 714/22

(58) Field of Classification Search ................... 700/9, 700/22; 713/340; 714/5, 6, 7, 22; 711/114
See application file for complete search history.

(56) References Cited

U.S. PATENT DOCUMENTS

| | | | | |
|---|---|---|---|---|
| 4,651,020 A | * | 3/1987 | Kenny et al. ................... 307/43 |
| 5,274,767 A | * | 12/1993 | Maskovyak .................... 710/16 |
| 5,633,539 A | * | 5/1997 | Tassitino, Jr. ................... 307/64 |
| 5,650,715 A | * | 7/1997 | Massie ........................ 323/273 |
| 5,894,413 A | * | 4/1999 | Ferguson ...................... 363/65 |
| 5,909,591 A | * | 6/1999 | Brooke .......................... 710/9 |
| 6,201,319 B1 | * | 3/2001 | Simonelli et al. .............. 307/26 |
| 6,629,045 B2 | * | 9/2003 | Chao et al. .................... 702/60 |
| 6,647,436 B1 | * | 11/2003 | Jedrzejewski et al. ......... 710/14 |
| 6,738,692 B2 | * | 5/2004 | Schienbein et al. ........... 700/286 |
| 6,832,324 B2 | * | 12/2004 | Mullins et al. ............... 713/300 |
| 7,043,647 B2 | * | 5/2006 | Hansen et al. ............... 713/320 |
| 2003/0135773 A1 | * | 7/2003 | Zhang et al. ................. 713/340 |
| 2004/0008462 A1 | * | 1/2004 | Kluth et al. ................... 361/90 |
| 2004/0010649 A1 | * | 1/2004 | Weaver et al. ............... 710/302 |
| 2004/0073854 A1 | * | 4/2004 | Windl ........................... 714/57 |
| 2005/0185352 A1 | * | 8/2005 | Nguyen ........................ 361/90 |
| 2006/0026325 A1 | * | 2/2006 | Huang et al. ................. 710/302 |
| 2006/0036794 A1 | * | 2/2006 | Sandy et al. ................. 710/302 |
| 2007/0016312 A1 | * | 1/2007 | Redmond et al. ............. 700/22 |
| 2007/0097659 A1 | * | 5/2007 | Behrens et al. .............. 361/788 |
| 2007/0245165 A1 | * | 10/2007 | Fung ........................... 713/320 |

* cited by examiner

*Primary Examiner*—Ramesh B Patel
*Assistant Examiner*—Darrin Dunn
(74) *Attorney, Agent, or Firm*—Muncy, Geissler, Olds & Lowe, PLLC

(57) ABSTRACT

An identification apparatus for backup-type power supply systems aims to be used on a backup-type power supply system which includes real power supply devices and dummy power supply devices to form a N+1 architecture to output power. It has signal generation means located on the real power supply devices and dummy power supply devices to generate real identification signals and dummy identification signals of different potentials and a signal detection means to receive the identification signals to identify the real power supply devices and dummy power supply devices. Thereby operators can clearly understand coupling and installation conditions of the power supply devices of the backup-type power supply system to perform power risk management.

17 Claims, 2 Drawing Sheets

IDENTIFICATION APPARATUS FOR BACKUP-TYPE POWER SUPPLY SYSTEMS

FIELD OF THE INVENTION

The present invention relates to an identification apparatus for backup-type power supply systems and particularly for a backup-type power supply system that includes real power supply devices and dummy power supply devices to form a N+1 architecture to output power.

BACKGROUND OF THE INVENTION

The conventional backup-type power supply system generally includes a plurality of power supply devices formed in a N+1 architecture. Takes 1+1 architecture as an example, it includes two power supply devices. It means that it allows malfunction occurred to one power supply device while another power supply device still maintains normal supply of power. In such a backup-type power supply system the power supply devices share a common structure. In other words, a plurality of power supply devices shares a common chassis and a controlling power integration back panel. In practice, if a higher safety power factor is not considered (such as the power consumption at the rear end electronic device is lower), a real power supply device and a dummy power supply device could commonly share a same structure. For instance, on the 1+1 architecture, only one real power supply device is installed, while a dummy power supply device is installed on another space. The dummy power supply device usually cannot supply power. Due to the constraint of installation space, the dummy power supply device generally has a specification, dimension and profile as that of the real power supply device. But it has a cooling air fan installed inside to avoid affecting the airflow, vibration and mechanical strength of the entire structure. Its power comes from the real power supply device through electrically connecting to a power integration back panel. Moreover, as the power supply device has to equip with safety self-inspection function, after the dummy power supply device is connected to the power integration back panel, it also can output a Power Good (PG) signal.

In the condition in which the dummy power supply device and the real power supply device are used in a mixed manner, if malfunction occurs to either of the dummy power supply device or the real power supply device, the controlling power integration back panel usually will generate a unusual alarm signal. But due to the dummy power supply device and the real power supply device are connected to the back panel through a connector of a standard specification (or a common panel), the monitor people at the remote end cannot distinguish from the alarm signal whether the malfunction occurs to real power supply device or the dummy power supply device unless they actually go to where the backup-type power supply system is installed to do onsite inspection. Hence to the monitor people at the remote site who have to monitor many backup-type power supply systems, they cannot immediately confirm the safety factor of the backup-type power supply systems. This seriously affects risk management capability.

SUMMARY OF THE INVENTION

The primary object of the present invention is to solve the aforesaid disadvantages. The present invention provides an identification means to identify dummy power supply devices and real power supply devices. Through an identification approach which may be a potential detection mode or an identification code coding mode, operators can clearly understand coupling and installation conditions of the power supply devices in the backup-type power supply system so that they can perform the risk management effectively.

Another object of the invention is to provide a display means outside the backup-type power supply system to display the installation conditions of the dummy power supply devices and the real power supply devices after having been determined by the identification means.

Yet another object of the invention is to send installation condition signals of the dummy power supply devices and the real power supply devices to a remote monitor center through the Internet after having been determined by the identification means.

DETAILED DESCRIPTION OF THE PREFERRED EMBODIMENTS

Figure 1:
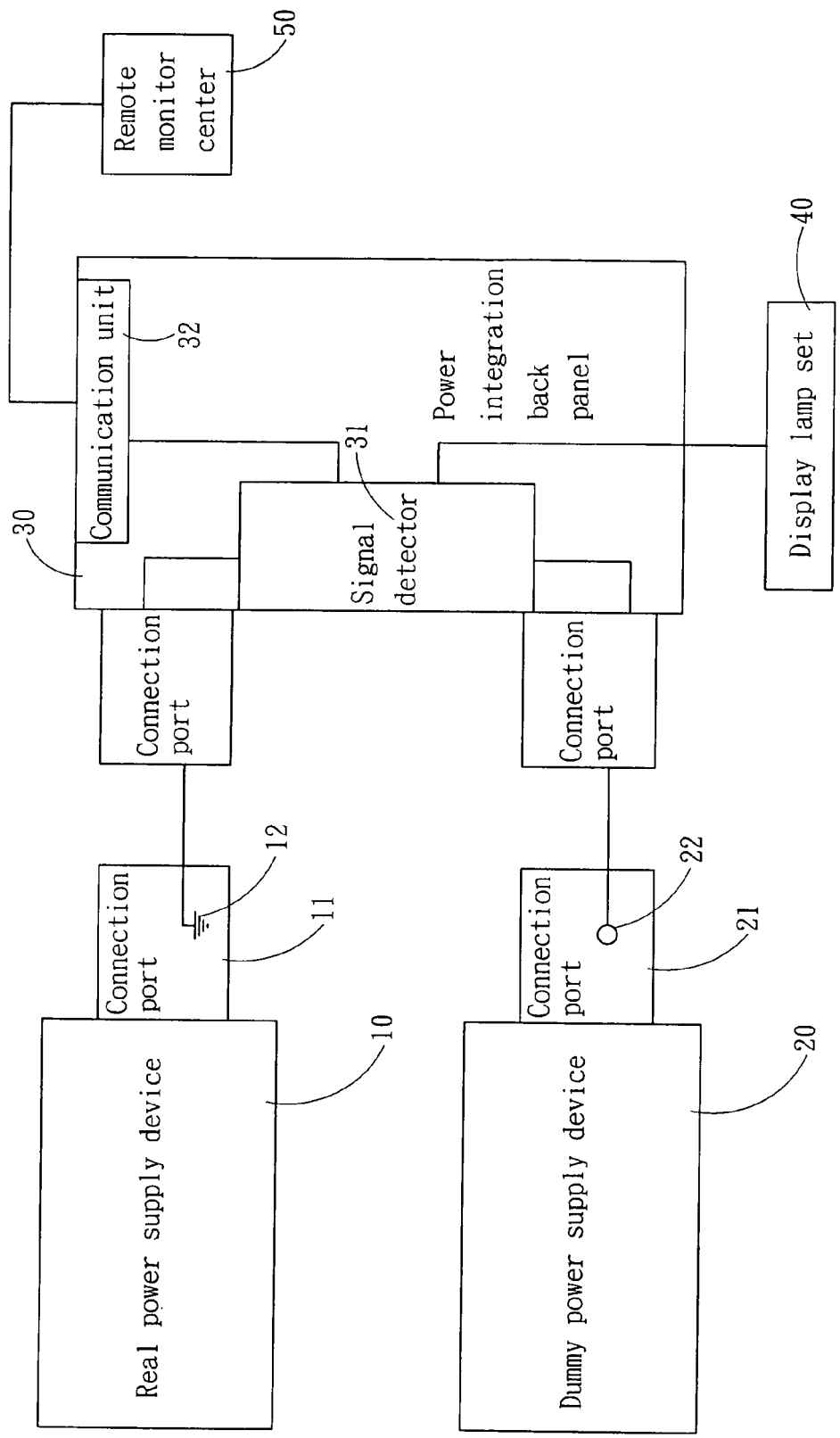
FIG. 1 is a schematic circuit block diagram of a first embodiment of the present invention.

Please refer to FIG. 1 for the schematic circuit block diagram of a first embodiment of the present invention. The backup-type power supply system includes N+1 power supply devices and a power integration back panel 30 connecting to the power supply devices to integrate power output. The power supply devices includes a real power supply device 10 and a dummy power supply device 20. The invention provides an identification signal generation means to allow the real power supply device 10 and the dummy power supply device 20 to generate a real identification signal and a dummy identification signal of different signal levels, and also provides a signal detection means to receive the identification signals to determine coupling and installation conditions of the real power supply device 10 and the dummy power supply device 20.

The circuit block diagram of the first embodiment adopts a potential detection mode. The identification signal generation means includes installing potential detection points of different potentials on the real power supply device 10 and the dummy power supply device 20. The potential detection points include a ground connection point 12 on a connection port 11 which is electrically connected to the real power supply device 10 and the power integration back panel 30, and a floating connection point 22 on another connection port 21 which is electrically connected to the dummy power supply device 20 and the power integration back panel 30. The signal detection means includes a signal detector 31 located on the power integration back panel 30 and connected to the potential detection points. When the backup-type power system is activated, the signal detector 31 detects through a linear resistor voltage. As the real power supply device 10 has the ground connection point 12, the identification signal obtained from the real power supply device 10 has a zero potential. On the other hand, the dummy power supply device 20 has the floating connection point 22, the identification signal obtained from the dummy power supply device 20 is a signal of a positive potential or a negative potential. If the signal detector 31 is an A/D converter, the potential signals at the potential detection points are converted to digital signals to inform operators. The invention can receive the identification signals through a display means to indicate the installation conditions of the real power supply device 10 and the dummy power supply device 20. The display means may be a display lamp set 40 located outside the backup-type power system, or a communication unit 32 installed on the power integration back panel 30. The communication unit 32 has a communication interface to transmit the identification signals to a remote monitor center 50. The communication interface may be selected from RS-232, RS-384 or I²C. The signal detector 31 may also be a communication interface to directly transmit the digitized identification signals to the remote monitor center 50. Thereby the operators not only can clearly determine the installation conditions of the real power supply device 10 and the dummy power supply device 20 through the display lamp set 40 on spot without making mistaken judgment of the power safety factor due to look alike appearance of the real power supply device 10 and the dummy power supply device 20, they can also clearly perform power risk management based on the clear understanding of the installation conditions of the real power supply device 10 and the dummy power supply device 20 through the communication interface at the remote communication center 50 without going onsite to do inspection.

Figure 2:
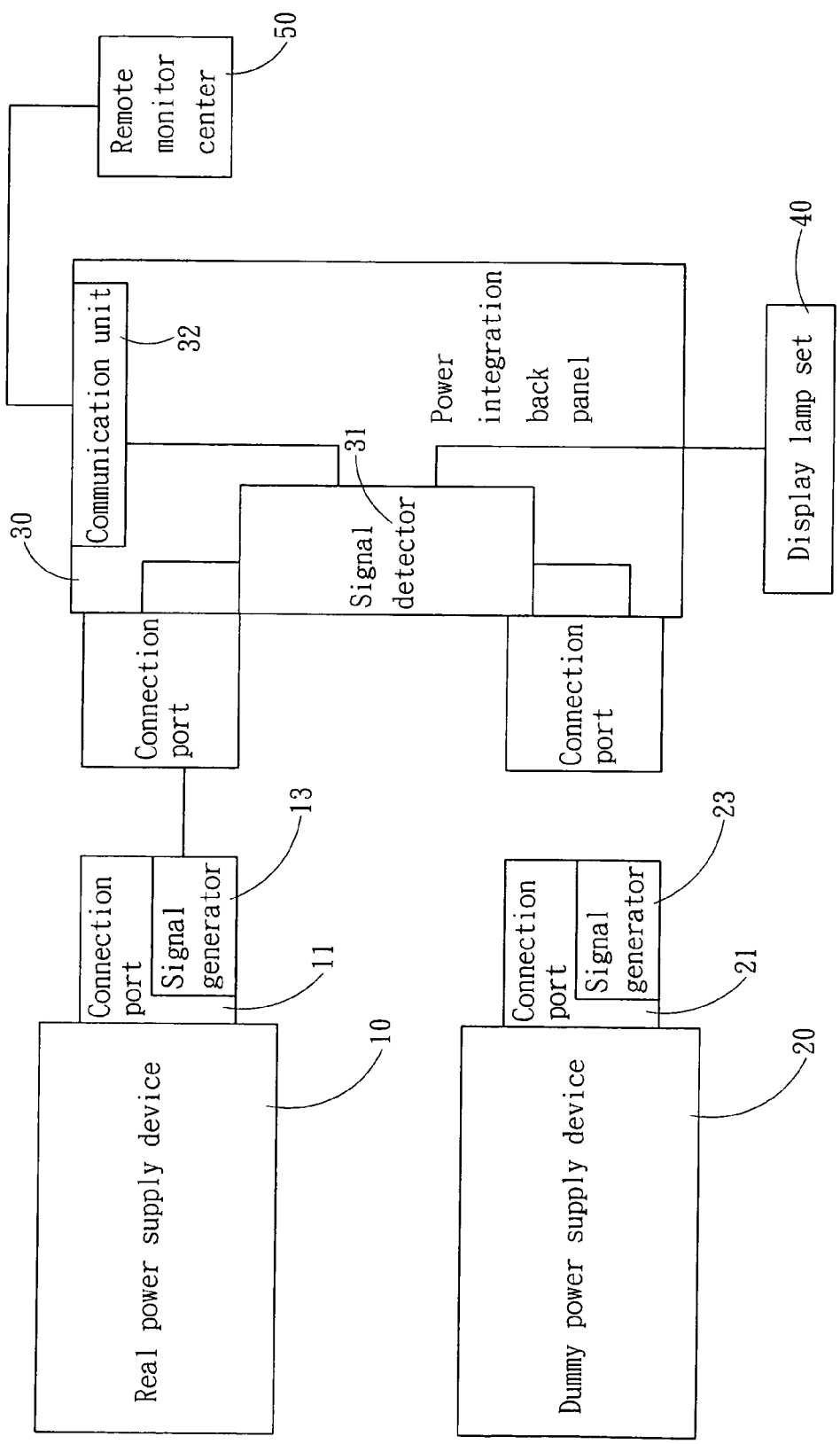
FIG. 2 is a schematic circuit block diagram of a second embodiment of the present invention.

Refer to FIG. 2 for the schematic circuit block diagram of a second embodiment of the present invention that adopts an identification code coding mode. The connection ports 11 and 21 of the real power supply device 10 and the dummy power supply device 20 have respectively a signal generator 13 and 23 to generate different identification codes for the real power supply device 10 and the dummy power supply device 20. For instance, "0" for the real power supply device 10 and "1" for the dummy power supply device 20. Thus when the signal detector 31 receives the identification codes from the real power supply device 10 and the dummy power supply device 20, the installation conditions of the real power supply device 10 and the dummy power supply device 20 can be clearly determined. Similarly, through the display lamp set 40 and communication unit 32, operator onsite or at the remote monitor center 50 can perform power risk management as desired.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An identification apparatus for a backup-type power supply system which includes N+1 power supply devices connecting to a power integration back panel which integrates power output, the power supply devices including a real power supply device and a dummy power supply device, the identification apparatus comprising:

a real identification signal generation means for generating a ground potential identification signal and a dummy signal identification generation means for generating a floating potential identification signal to indicate whether a malfunction refers to a real power supply device or a dummy power supply device, wherein the real signal identification means is located on a connection port of the real power supply device and the dummy signal identification means is located on a connection port of the dummy power supply device, which dummy power supply device does not supply power, but has a specification, dimension and profile of a real power supply device, including a cooling air fan, and wherein power for the dummy power supply device comes from the real power supply device; and a signal detecting means for receiving the real identification signal and the dummy identification signal, which signal detection means is configured to transmit the real identification signal and the dummy identification signal to determine installation and coupling conditions of both the real power supply device and the dummy power supply device ; and a display means for indicating the coupling and installation conditions of the real power supply device and the dummy power supply device.

2. The identification apparatus for a backup-type power supply system of claim 1, wherein the means for generating identification signal include installing voltage detection points of different voltages on the real power supply device and the dummy power supply device, the means for detecting signal is a signal detector located on the power integration back panel connecting to the voltage detection points.

3. The identification apparatus for a backup-type power supply system of claim 2, wherein the voltage detection points are a ground connection point electrically connecting to the real power supply device and the power integration back panel and a floating connection point electrically connecting to the dummy power supply device and the power integration back panel.

4. The identification apparatus for a backup-type power supply system of claim 2, wherein the signal detector is an A/D converter to convert the voltage value at the voltage detection points to digital signals.

5. The identification apparatus for a backup-type power supply system of claim 2 further including a display means to receive the identification signals and display the installation conditions of the real power supply device and the dummy power supply device.

6. The identification apparatus for a backup-type power supply system of claim 5, wherein the display means is a display lamp set located outside the backup-type power supply system.

7. The identification apparatus for a backup-type power supply system of claim 5, wherein the display means has a communication unit which has a communication interface to transmit the identification signals to a remote monitor center.

8. The identification apparatus for a backup-type power supply system of claim 7, wherein the communication interface is selected from the group consisting of RS-232, RS-384 and I²C.

9. The identification apparatus for a backup-type power supply system of claim 1, wherein the means for generating identification signal are signal generators located on the real power supply device and the dummy power supply device to generate signals of different identification codes, the means for detecting signal is a signal detector located on the power integration back panel to receive the identification codes output from the signal generators.

10. The identification apparatus for a backup-type power supply system of claim 9 further including a display means to receive the identification signals and display the installation conditions of the real power supply device and the dummy power supply device.

11. The identification apparatus for a backup-type power supply system of claim 10, wherein the display means is a display lamp set located outside the backup-type power supply system.

12. The identification apparatus for a backup-type power supply system of claim 10, wherein the display means has a communication unit which has a communication interface to transmit the identification signals to a remote monitor center.

13. The identification apparatus for a backup-type power supply system of claim 12, wherein the communication interface is selected from the group consisting of RS-232, RS-384 and I²C.

14. The identification apparatus for a backup-type power supply system of claim 1, wherein the means for detecting signal is a communication interface to transmit the identification signals to a remote monitor center.

15. The identification apparatus for a backup-type power supply system of claim 14, wherein the communication interface is selected from the group consisting of RS-232, RS-384 and I²C.

16. The identification apparatus for a backup-type power supply system of claim 1, wherein the identification signals are separate from the malfunction indication.

17. The identification apparatus for a backup-type power supply system of claim 1, wherein the real and dummy power supply devices share a common structure.

* * * * *